United States Patent [19]

Feldwick et al.

[11] 3,965,042

[45] June 22, 1976

[54] FORMATION OF ALUMINA-CONTAINING PARTICLES WITH ALUMINUM HYDROXIDE BINDER

[75] Inventors: Raymond Douglas Feldwick, Cockeysville; Darrell Edward Hildebrandt, Baltimore, both of Md.

[73] Assignee: W. R. Grace & Co., New York, N.Y.

[22] Filed: Dec. 7, 1973

[21] Appl. No.: 422,721

[52] U.S. Cl. .................. 252/455 R; 252/455 Z; 252/463
[51] Int. Cl.² .................. B01J 29/06; B01J 23/08
[58] Field of Search ............ 252/455 R, 455 Z, 463

[56] References Cited
UNITED STATES PATENTS 3,459,680  8/1969  Plank et al. .................... 252/455 Z
3,808,153  4/1974  Chomitz et al. .................... 252/463

Primary Examiner—Carl F. Dees
Attorney, Agent, or Firm—Giedre M. McCandless

[57] ABSTRACT

A process for preparing alumina-containing nodules characterized with improved mechanical properties which includes mixing powder of alumina, aluminosilicate, or mixtures thereof with an aqueous slurry having a pH in the range from about 7.5 to about 9 and comprising from about 0.2 to about 5 percent by weight of aluminum hydroxide, calculated as alumina, followed by forming, drying and calcining. The products include minor amounts of alumina binder and find use as sorbents, catalysts, and catalyst supports.

7 Claims, No Drawings

FORMATION OF ALUMINA-CONTAINING PARTICLES WITH ALUMINUM HYDROXIDE BINDER

BACKGROUND OF THE INVENTION

The present invention relates to a process for preparing bonded crystalline alumina-containing nodules characterized with improved properties such as better crush strength and increased attrition resistance.

Crystalline alumina-containing nodules are well known in the art for use as sorbents, catalyst supports and as catalysts per se. Principal components of nodules used in these applications include alumina per se, aluminosilicates, and mixtures of alumina with aluminosilicates.

Activated alumina particles prepared by a number of heretofore known processes and sometimes designated in the trade as "hard alumina", while often exhibiting good crush resistance, have not been entirely satisfactory in regard to other mechanical properties, especially regarding attrition resistance. In general, prior art techniques for improving attrition resistance of nodules of alpha alumina, gamma alumina and other types of alumina have resulted in sacrifice of important mechanical properties, typically including loss of crush strength, pore size, etc.

A number of aluminosilicates are available to the art for use as sorbents, catalysts, and catalyst carriers. An example is natural or synthetic mullite. U.S. Pat. No. 3,533,738 to Rundell et al. describes a process for preparing a synthetic crystalline mullite which is disclosed to be desirable as a base for various catalysts.

Other crystalline aluminosilicates known in the catalyst and sorbent arts include natural and synthetic zeolites. Chemically the zeolites can be represented in hydrated form by the following general formula:

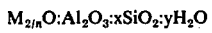

wherein M is a cation which may be a metal in group I or II of the periodic table, a transition element of the periodic table, hydrogen, ammonium, or mixtures of these cations, $n$ is the valence of the cation, $x$ is normally in the range of 1 to 15 and $y$ is a function of the degree of hydration.

Natural zeolites include levynite, erionite, faujasite, analcite, paulingite, noselite, ferriorite, heulandite, scolecite, stilbite, clinoptilolite, harmotome, phillipsite, brewsterite, flakite, datolite, chabazite, gmelinite, cancrinite, leucite, lazurite, scapolite, ptilolite, mesolite, mordenite, nepheline, natrolite, and sodalite.

Some representative synthetic crystalline aluminosilicate zeolites include Zeolite A, Zeolite X, Zeolite Y, Zeolite L, Zeolite O, Zeolite R, Zeolite S, Zeolite T, Zeolite Z, Zeolite F, Zeolite Q, and Zeolite B. For more complete formula representations for each of these synthetic crystalline zeolites see U.S. Pat. No. 3,140,251 to Charles J. Plank et al.

Type A zeolite has a silica to alumina mole ratio of 1.85 ± 0.5 illustration and is described in greater detail in U.S. Pat. No. 2,882,243 to Milton.

The various zeolites can be distinguised one from others by their respectively characteristic X-ray diffraction patterns which indicate different crystal lattice structures.

The faujasites constitute an important group of zeolites. The faujasite structure consists of a diamond type crystal lattice of cubo-octahedral units joined by pairs of six-membered oxygen rings. Faujasite has a well-ordered structure having all the aluminum atoms tetrahedrally coordinated with oxygen and one excess negative charge for each aluminum atom in the lattice. This charge is electrically balanced by a highly mobile cation.

The zeolites designated Zeolite X and Zeolite Y by the Linde Division of Union Carbide Corporation are commonly referred to as synthetic faujasites. Zeolite Y is described in U.S. Pat. No. 3,130,007 to Breck and is generally similar to Zeolite X described in U.S. Pat. No. 2,882,244 to Milton. The chemical formula given for Zeolite Y in U.S. Pat. No. 3,130,007 may be represented as follows:

where $x$ has a value of greater that 3, e.g., up to about 6, and $y$ may have a value as high as 9. Type X zeolites have a silica to alumina ratio of from 2 to 3, e.g., about 2.5. The ratio of silica to alumina affects important physical properties of faujasite. Synthetic faujasite having a silica to alumina mole ratio of more than 4.5 is of special interest in high temperature applications in that thermal stability thereof is greater than the stability typically exhibited by synthetic faujasite having a lower silica to alumina ratio. Type X and Type Y zeolites find use as components of hydrocarbon cracking catalysts.

In contrast to faujasite, mordenite has a silica to alumina mole ratio of about 7 to 11, usually about 9 to 10.

Substantial effort has been devoted heretofore to develop efficient methods for improving mechanical properties of various aluminosilicates. Naturally occurring clays, such as kaolin, attapulgite and bentonite, inorganic oxide sols, and inorganic oxide gels and cogels, have heretofore been proposed for binding particles of sorbents, catalyst supports, and catalysts, with binderless compositions also being known to the art. However, in general, these approaches have not been entirely satisfactory from the standpoints of good balance of mechanical properties and efficiency.

For examples of use of silica-containing cogels as binders or matrix material, see U.S. Pat. Nos. 3,329,628 to Gladrow et al. and 3,393,156 to Hansford.

Gladrow et al. in U.S. Pat. No. 3,326,818 describe a method of making catalyst compositions which includes dry mixing 51 to 95 wt. percent crystalline aluminosilicate zeolite and 5 to 49 wt. percent of a dry inorganic gel binding agent (permissively dry alumina gel) containing a peptizing agent. Thereafter, sufficient water is added to form a thick plastic mass which is subsequently dried to a composite product including at least 5 wt. percent of the binding agent.

U.S. Pat. No. 3,365,392 to Mitsche et al. describes a reforming catalyst having preferably less than 20 wt. percent of a finely divided crystalline aluminosilicate suspended in an alumina matrix and at least one active catalytic component.

U.S. Pat. No. 3,498,928 to Cho et al. describes addition of an organic solution of aluminum alkoxide to a granular mixture of a zeolite with oxides of copper and manganese in a method for ultimately preparing an oxidizing catalyst, resulting in forming a network binding structure of 2 to 6% aluminum oxide in the catalyst granules.

In U.S. Pat. No. 3,562,345, Mitsche describes a process for preparing a composition comprising about 60 to about 90 weight percent of an aluminosilicate containing alumina fixed in combination therewith. Briefly, the process includes heating in admixture with an alumina sol an aluminosilicate characterized by a silica/alumina mole ratio of from about 6 to about 12 and pore openings of from about 3 to about 8 angstroms, recovering an aluminosilicate—alumina sol product, gelling the sol product, and thereafter washing and drying the aluminosilicate-alumina gel product.

Haden et al., referring in U.S. Pat. No. 3,065,054 to prior art methods of producing synthetic crystalline type A zeolites (stated to be inherently in powdered form), state that binders such as colloidal clays or hydrous alumina are used in order to agglomerate the powdered zeolites or sorbents. According to the description, substantial quantities of binder, often 20 percent or more, are used in order to produce pellets of adequate resistance to attrition with attendant decreases in sorptive capacity.

U.S. Pat. No. 3,406,124 to Eastwood et al. describes a composite organic conversion catalyst containing an active crystalline aluminosilicate component and an alumina containing clay component which has been leached and neutralized. A method for preparing such catalysts is disclosed which includes leaching alumina from a clay matrix material, precipitating aluminum hydroxide on the clay, and thereafter mixing the treated clay with finely divided crystalline aluminosilicate. The patent teaches that the precipitated aluminum hydroxide subsequently acts as a binder for the clay and results in production of an attrition resistant composite product.

Chemical Abstracts, Vol. 60, reference 12696d, briefly discusses use of aluminum hydroxide or silicic acid as a binder for molecular sieves, the binder apparently being derived from an aqueous solution of a water soluble aluminate or silicate with specified derivatives of organic acids.

Chemical Abstracts, Vol. 66, reference 87197d, in abstracting French Patent 1,450,633, discloses preparation of molecular sieve aggregates by extruding a mixture of sieve particles $> 1$ $\mu$ and a binder selected from activated $Al_2O_3$, $SiO_2$, clay or cement. Corresponding British Patent 1,130,639 adds that the alumina is active alumina obtained by partial dehydration of alumina trihydrate usually crushed to small grain sizes.

Chemical Abstracts, Vol. 56, reference 13794f, refers to mechanical stability problems in fluidized systems of molecular sieve catalysts bonded with clay minerals or a gel of $Al(OH)_3$ to form granules of 3–5 mm. diam. A spray process for making molecular sieve zeolites in granules of 30–600 $\mu$ diam. is proposed wherein binder clay is added.

Chemical Abstracts, Vol. 73, reference 7567, indicates that fabrication of molecular sieves using $Al_2O_3$ or $SiO_2$ as binder is reviewed in Fetle, Seifen, Anstrichm.

BRIEF DESCRIPTION OF THE INVENTION

It has now been found that alumina-containing nodules characterized with improved mechanical properties can be prepared by a new improved process which includes preparing an aqueous slurry having a pH in the range from about 7.5 to about 9 and comprising from about 0.2 to about 5 percent by weight of aluminum hydroxide [$Al(OH)_3$], calculated as alumina ($Al_2O_3$), by adding sufficient ammonia or aqueous ammonium hydroxide with an aqueous solution of an acid salt of aluminum. Thereafter, a substantially dry powder of alumina, aluminosilicate or a mixture of alumina with aluminosilicate is mixed with the gelatinous aluminum hydroxide slurry or alumina gel in relative amounts such that the ultimately formed, dried and calcined nodular product includes a minor amount of alumina binder, e.g., from about 0.05 to about 1.5 parts by weight alumina ($Al_2O_3$) binder per 100 parts by weight of the alumina or alumino-silicate nodules.

Typically, nodular products prepared by the process of the present invention are characterized with increased uniformity and improved mechanical properties, e.g., increased crush strength, greater attrition resistance, etc. The present invention also aids in nodule forming in that, for example, more uniform extruder power input has been observed when extruding alumina-containing powders treated using the present process. Unexpectedly the advantages of the present invention may obtain using minor amounts of alumina binder provided by the alumina gel or hydrous alumina without requiring dispersants. A number of prior art alumina-containing sorbents and catalyst supports typically require lignosulfonate or other dispersants.

Products prepared by the present process find use as sorbents, catalyst supports and as catalysts per se.

DETAILED DESCRIPTION OF THE INVENTION

Initially, an aqueous solution of a suitable acid salt of aluminum is prepared by dissolving the salt in a suitable aqueous medium, e.g., water. The acid salt may be aluminum sulfate, aluminum nitrate, aluminum chloride, aluminum oxalate, aluminum acetate, mixtures thereof, and the like, and may be hydrated or not as desired. Acid salts preferred herein are aluminum sulfate and aluminum nitrate. Generally, the acid salt may be selected without concern for anionic poisoning of the catalysts which may ultimately be prepared. For example, while chloride is known to poison catalysts used for converting noxious components of automobile exhaust into innocuous entities, use of aluminum chloride as the acid salt in the present process is generally found not to result in inclusion of deleterious amounts of chloride in the final product.

The acid salt solution may be prepared and used at any temperature suitable for precipitating substantially all the aluminum salt as gelatinous aluminum hydroxide or alumina gel by addition of ammonia to a final solution pH of from about 7.5 to about 9, and preferably from about 8.0 to about 8.6 pH. The amount of acid salt dissolved in the solution is selected to precipitate aluminum hydroxide in an amount equivalent to from about 0.2 to about 5 percent by weight of alumina, based on the weight of the final slurry prepared using the ammonia addition next described. For example, the following salts may be added in the approximate amounts indicated per one part by weight of the desired equivalent amount of alumina, calculated as $Al_2O_3$ (M.W. 101.94); aluminum sulfate, $Al_2(SO_4)_3$ (M.W. 342.14), 3.34 parts; aluminum sulfate nonohydrate, $Al_2(SO_4)_3 \cdot 9H_2O$ (M.W. 504.28), 4.93 parts; and aluminum nitrate, $Al(NO_3)_3 \cdot 9H_2O$ (M.W. 375.14), 3.67 parts.

After preparing a suitable acid aluminum salt solution, ammonia or aqueous ammonium hydroxide solution is added in an amount sufficient to precipitate gelatinous aluminum hydroxide and increase the pH of the resulting slurry to a final pH in the range from about 7.5 to about 9. The aluminum hydroxide slurry or colloidal suspension preferably includes from about 0.2 to about 5 percent by weight of alumina, calculated as $Al_2O_3$. A slurry having a higher concentration may initially be prepared and thereafter diluted to the aforesaid alumina weight range and still be within the scope of this invention.

It is critical that the final pH is in the range from about 7.5 to about 9. It is found that attempted use in the present process of such slurries except having final pH outside this range results in failure to prepare products characterized with adequate mechanical properties for suitable use as sorbents, catalyst supports, and catalysts per se.

The precipitation is usually complete within about 5 minutes.

Desirably, the viscoscity of the slurry is not more than about 80, (e.g. from about 15 to about 60) centipoises at use temperatures of from about 70°F to about 140°F. Use of slurries at viscosities above about 80 centipoises is generally found to result in decreases in the substantial uniformity of dispersion of the binder throughout the alumina-containing powder. Typically, aluminum hydroxide containing slurries having from about 0.2 to about 5 percent by weight of alumina have suitable viscosity at temperatures from about 70°F to about 140°F. If desired, in instances where the slurry viscosity is without the range from about 15 to about 60 centipoises, the viscosity may be adjusted into compliance with the range, as for example by adjusting the slurry temperature.

Next, the aluminum hydroxide slurry having a pH in the critical range from about 7.5 to about 9 is mixed with substantially dry alumina-containing powder. Any suitable mixing device may be used to effect the mixing. In general, the alumina-containing powder is added in an amount from about 92.5 to about 99.8 and preferably from about 95 to about 99.8 parts by weight per one part by weight of the treated aluminum salt (calculated as $Al_2O_3$) in the previously prepared slurry. While the order of addition is not critical, mixing is effected preferably by adding the slurry to the powder.

The alumina-containing powder may be almost any finely divided alumina, aluminosilicate, or alumina-aluminosilicate mixture. It is generally found that of the aluminosilicates, powders having a mole ratio of alumina to silica in the range from about 1.5 to about 7, and preferably from about 1.5 to about 6, moles of $Al_2O_3$ per mole of $SiO_2$ benefit most from the present process from the standpoint of improvements in crush strength and resistance to attrition.

Powder mixtures of alumina with aluminosilicate useful herein include mixtures including from about 30 to about 38 parts by weight of alumina and from about 67 to about 78 parts by weight of aluminosilicate.

In a preferred embodiment, the alumina-containing powder is mullite ($3Al_2O_3 \cdot 2SiO_2$), preferably synthetic mullite. Crystalline and microcrystalline mullites of the type which may be prepared using the process described in U.S. Pat. No. 3,533,738 to Rundell et al. are found to be eminently suitable in the present process. The aforesaid Rundell et al. patent is incorporated herein in pertinent part by reference. Generally stated, the process described therein includes cogelling solutions of salts of silica and alumina followed by drying, such as spray drying, washing and crystallization. The patent discloses that the product recovered can have a surface area as high as about 120 square meters per gram. More particularly, the synthetic mullite may be prepared, for example, by an embodiment of the process therein taught which includes forming a cogel by mixing a solution of an alkali metal silicate with a solution of an aluminum salt in amounts sufficient to provide a molar ratio of silica to alumina of about 0.6 to about 3 and a pH of 6 to 7, spray drying the cogel, reducing the alkali metal content of the spray dried product by exchanging with an ammonium sulfate solution, and crystallizing the exchanged spray-dried product by calcination for a period of from about 5 minutes to about 60 hours at from about 900°C to about 1400°C. In greater detail, the synthetic mullite may be prepared, for example, using the two solution cogellation technique of EXAMPLE 2 of the aforesaid U.S. Pat. No. 3,533,738 patent wherein preparation of a mullite product having a surface area of 73.5 square meters per gram is described. As will be apparent to those skilled in the art, the process of U.S. Pat. No. 3,533,738 can be adapted to prepare synthetic mullites having a surface area of from about 25 to about 350 square meters per gram by selecting appropriate calcination times.

Better results may be obtained in the present process using a mullite precursor powder, e.g., the powder which may be recovered from the Rundell et al. process after their exchange step and prior to their crystallization step. Nodules prepared by the present process using synthetic mullite in powder or precursor form as the aluminosilicate are eminently suitable for use as supports for automobile exhaust conversion catalysts. It is critical for such end use that the nodules ultimately prepared be free of $Na_2O$ in excess of 0.05 percent by weight. This requirement may be met by ion exchange, as with ammonium ions, as may be required. Methods for exchanging alkali metal zeolites with ammonium ions to decrease alkali metal content are well known. See, for example, U.S. Pat. No. 3,402,996 to Maher et al.

In another preferred embodiment, the alumina-containing powder comprises a faujasite type zeolite precursor, preferably in admixture with from about 30 to about 38 percent by weight of alumina. Powders comprising precursors of type X zeolites, i.e., powders comprising precursors of faujasites having a silica to alumina mole ratio of from slightly about 2 to about 3 moles $Al_2O_3$ to $SiO_2$, may be treated by the present process to ultimately prepare commercially attractive sorbents. Powders comprising precursors of type Y zeolites, i.e., powders comprising precursors of faujasites having a silica to alumina mole ratio of about 3 to about 7 may be added with the aluminum hydroxide slurry to ultimately effect preparation of eminently suitable catalyst supports. Uses for these supports include supports for catalysts in petroleum cracking processes.

After precipitaiton is complete, usually in from about 5 to about 15 minutes, the precipitate may be formed into a variety of useful forms, including spheres, granules, pills, extrudates, and like particulate forms, all of which, for simplicity, are referred to herein as nodules.

After the nodules are formed, the formed precipitate is dried in any suitable manner. Drying is normally effected in a period from about 1 to about 20 hours at a temperature in the range of about 250°F to about 400°F.

After the nodules are dried, calcination is effected. In general, the nodules are calcined at temperatures in the range of about 1000°F to about 2000°F for about 0.5 to about 10 hours. Where the alumina-containing precursor is amorphous synthetic mullite precursor and it is desired to use the nodules as a base for an auto exhaust catalyst, calcination is effected preferably at a temperature in the range of from about 1600°F to about 1800°F for from about 2 to about 8 hours, preferably at least 6 hours. Where the alumina-containing powder is a faujasite precursor, calcination is effected preferably at a temperature in the range from about 900°F to about 1200°F for about 0.5 to about 4 hours, preferably at least 3 hours.

Calcination using temperatures and/or times other than those specified above generally results in products having inadequate balance of attrition resistance, crush strength, porosity, and surface area for satisfactory use as catalyst bases and sorbents.

The finely divided alumina-containing compositions added to the aluminum hydroxide slurry may have any suitable particle size. Better results have been observed using powder having an average diameter in the range from about 1 to about 9 microns. Preferably the average diameter of the finely divided alumina-containing composition is from about 4 to about 6 microns. The diameter of the nodular products may be controlled as desired using well known nodule forming techniques.

Alumina-containing powders which may effectively be improved in mechanical properties using the present process may have any suitable pore size. It is usually found that no substantial change in pore size of the powders is effected using this process. Typically, prior art processes proposed for increasing attrition resistance of alumina or aluminosilicate sorbents and catalyst supports substantially affect pore size, thereby complicating the task of users desiring sorbents, catalysts and supports having suitable pore size. Especially good sorbents, catalysts, and catalyst supports can be prepared by the present process using commercially available powders characterized with average pore diameters in the range from about 70 to about 120 Angstroms.

The attrition resistance data in the examples which follow was determined using a well known procedure as follows:

A first 50 gram sample of the nodules and 10 United States copper pennies are placed on a 50 mesh screen. After shaking the screen for thirty minutes, screen-passed nodules are recovered and the weight thereof is determined in grams. A second 50 gram sample of the nodules is similarly treated except that no pennies are used. The number of grams of screen-passed nodules of the second sample is subtracted from the number of grams of screen-passed nodules of the first smaple and the result is reported as a percentage of 50 grams. In this test procedure a result of zero percent indicates maximum attrition resistance.

The crushing strength data for the products prepared in the examples which follow was determined using ASTM procedure D695-69.

The determination was made by selecting at least five (5) typical specimens. The test was conducted by using a standard testing machine capable of control of constant rate-of-crosshead movements. The device was equipped with a drive mechanism, a supporting jig and a compressive tool for applying the load to the test specimens. The tool is so constructed that loading is axial within 1:1000 and applied to surfaces that are flat within 0.025 millimeter and parallel to each other in a plane normal to the vertical loading axis.

The nodules are placed on the supporting jig and the dead weight load (in pounds) that 5 nodules will withstand is measured. The results are reported as the average crushing strength.

The present invention is further illustrated by the following non-limiting examples, wherein the processes were carried out using commercially available products.

EXAMPLE 1

568 grams of $Al_2(SO_4)_3 \cdot XH_2O$ (corresponding to 0.211 pounds of $Al_2O_3$) was dissolved in 125.4 pounds of water at 120°F. Concentrated aqueous $NH_4OH$ was added with stirring to form a slurry having a final pH of 8.5 and including 0.16 percent by weight of gelatinous aluminum hydroxide precipitate, calculated as $Al_2O_3$. The slurry, having a viscosity of 20 to 30 centipoises at 100°F to 120°F, was blended with 200 pounds (dry basis) of mullite precursor powder (amorphous $3 Al_2O_3 \cdot 2SiO_2$) containing less than 0.1 percent $Na_2O$ for one hour using conventional blending techniques. The water content of the blend was increased to 57 percent by adding water in a sufficient amount. The diluted blend was formed into relatively porous spheres using conventional sphere forming techniques. After drying at 250°F for 16 hours followed by calcining at 1800°F for 3 hours, the spheres were found to be uniformly bonded with 0.11 percent $Al_2O_3$ from the aluminum hydroxide precipitate. These spheres had an average crushing strength of 20.3 pounds and density of 0.51 gram per cubic centimeter (g/cc). Spheres made in the same manner but without the binder were found to have an average crushing strength of 10 to 13 pounds and a density of 0.48 g/cc.

The spheres prepared in this example are eminently suitable in use as supports for auto exhaust catalysts.

EXAMPLE 2

8.35 pounds of $Al_2(SO_4)_3 \cdot XH_2O$ (corresponding to 1.41 pounds of $Al_2O_3$) was dissolved in 20 pounds of water at 120°F. Concentrated aqueous $NH_4OH$ was added with stirring to form a highly viscous slurry having a final pH of 8.5 and including 7 percent by weight of gelatinous aluminum hydroxide precipitate, calculated as $Al_2O_3$. The slurry was diluted with 50 pounds of water and thereafter blended with 154 pounds (dry basis) of a commercially available faujasitic precursor powder including 79 weight percent (dry basis) type X unseeded zeolite and 21 weight percent (dry basis) Avery clay. Blending was continued for 30 minutes using a commercially available blender. Thereafter the blend was diluted to 44 percent by weight water content and allowed to mull for 45 minutes. After mulling, the blend was concentrated to 40.5 percent by weight water using conventional evaporation procedures and thereafter extruded through a ⅛-inch die using a 4-inch extruder. After drying at 250°F for 12 hours, the extrudates included 17 percent by weight volatile matter.

The extrudates were granulated through a 16 mesh Tyler screen of a Stokes granulator and screened 16 to 40 mesh (Tyler screen series) on a Sweco vibratory separator. 48 percent of the extrudates were recovered in the 16 to 40 mesh range from the granulation and screening operations, i.e., the yield was 48 percent.

These recovered granules were next calcined at 1150°F for 3 hours.

Tests showed that the calcined granules included 0.915 percent by weight alumina, calculated as $Al_2O_3$, from the aluminum hydroxide precipitate, and were further characterized by an average attrition of 9.7 percent and a density of 0.606 g/cc.

Granules were prepared by slurrying the faujasitic precursor powder described above with Orzan S, followed by the above described procedure of drying through calcination. These granules were found to have an average attrition of 6 to 12 (about 9) percent and a density of 0.550 g/cc. Orzan S is the trademark for a spent sulfite liquor product of lignosulfonate and wood sugars by Crown Zellerbach Corp., Chemical Products Division. While Orzan S is known for its strong binder properties, the relatively high concentration of sodium and trace metals renders the product of limited utility in the sorbent and catalyst arts where such impurities are undesirable and after intolerable.

The granules prepared by the process of this invention as illustrated by this example are thus seen to have suitable resistance to attrition for sorbent and catalyst use, and at the same time are found to be substantially free of sodium and trace metal impurities.

EXAMPLE 3

1310 grams of $Al_2(SO_4)_3 \cdot XH_2O$ (corresponding to 222 grams of $Al_2O_3$) was dissolved in 1.2 liters (about 1200 grams) of water at 120°F. Concentrated aqueous ammonium hydroxide was added with stirring to form a slurry having a final pH of 8.3. Next, 2.5 liters (about 2500 grams) of water was added and the resulting diluted slurry was found to include 0.6 percent by weight of gelatinous aluminum hydroxide precipitate, calculated as $Al_2O_3$. The diluted slurry, having a viscosity of about 20 to about 30 centipoises at 100°F to 120°F, was blended with 6 pounds (dry basis) (about 2700 grams) of a commercially available hydrocracking catalyst base precursor powder including 75 percent by weight (dry basis) $Mg-NH_4+Y$ zeolitic molecular sieves (a faujasite precursor having a silica to alumina mole ratio of 4.5 moles of $SiO_2$ per mole of $Al_2O_3$ and not more than 1.5 percent by weight sodium, calculated as $Na_2O$) and 25 percent by weight (dry basis) alumina containing not more than 0.2 percent by weight sodium calculated as $Na_2O$. Blending was continued for 35 minutes using a commercially available blender and adding water as required to maintain the blend at a water content of 50 percent by weight. After blending, the blend was concentrated to 45 percent by weight volatile matter using standard evaporation procedures and thereafter extruded through a ⅛-inch die using a 4-inch extruder. After drying for 12 hours at 250°F and calcining for 3 hours at 1000°F, tests showed that the recovered extrudate included 6.5 percent by weight alumina, calculated as $Al_2O_3$, from the aluminum hydroxide precipitate, i.e., in addition to the $Al_2O_3$ included in the hydrocracking catalyst base precursor. Results of crush strength tests conducted using the procedure described in the description preceding Example 1 showed that the average crush strength of these extrudates was 14.8 pounds. The density was 0.61 g/cc.

For comparison with the extrudates of this example, binderless extrudates were prepared from the +Y sieve hydrocracking catalyst base precursor described above by mixing the precursor with 55 percent by weight water, followed by the foregoing extruding, drying, and calcining procedure. The binderless extrudates were found to have an average crush strength of 6.0 pounds and a density of 0.56 g/cc.

The improved crush strength of the extrudates of this example permits longer service lives for hydrocracking catalysts which can be prepared using the extrudates as catalyst supports.

EXAMPLE 4

354 grams of $Al(NO_3)_3 \cdot XH_2O$ (corresponding to 0.170 pound $Al_2O_3$) was dissolved in 0.4 liter (about 400 grams) of water at 120°F. Concentrated aqueous ammonium hydroxide was added with stirring to form a slurry having a final pH of 8.3. Next, 3 liters (about 3000 grams) of water was added and the resulting diluted slurry was found to include 1 percent by weight of gelatinous aluminum hydroxide precipitate, calculated as $Al_2O_3$. The diluted slurry, having a viscosity of about 20 to about 50 centipoises at 100°F to 120°F, was blended with 10.3 pounds (dry basis) (about 4630 grams) of a commercially available hydrocracking catalyst base precursor powder including 75 percent by weight (dry basis) $Mg-NH_4-Y$ zeolitic molecular sieves (a faujasite precursor having a silica to alumina mole ratio of 4.5 moles of $SiO_2$ per mole $Al_2O_3$ and not more than 1.5 percent by weight sodium, calculated as $Na_2O$) and 25 percent by weight (dry basis) alumina containing not more than 0.2 percent by weight sodium calculated as $Na_2O$. Blending was continued for 45 minutes using a commercially available blender and adding water as required to maintain the blend at a water content of 55 percent by weight. After blending, the blend was concentrated to 51 percent by weight volatile matter using standard evaporation procedures, and thereafter extruded through a ⅛-inch die using a 4-inch extruder. After drying for 12 hours at 250°F to 17 percent by weight volatile matter and calcining for 3 hours at 100°F, tests showed that the recovered extrudate included 1.8 percent by weight alumina, calculated as $Al_2O_3$, from the aluminum hydroxide precipitate, i.e., in addition to the $Al_2O_3$ provided by the hydrocracking catalyst base precursor. Results of crush strength tests conducted using the procedure described in the description preceding Example 1 showed that the average crush strength of these extrudates was 10.8 pounds. The density was 0.48 g/cc.

For comparison with the extrudates of this example, binderless extrudates were prepared from the −Y sieve hydrocracking catalyst base precursor described above by mixing the precursor with 55 percent by weight water, followed by the foregoing extruding, drying, and calcining procedure. The binderless extrudates were found to have an average crush strength of 6 pounds and a density of 0.56 g/cc.

The improved crush strength of the extrudates of this example permits longer service lives for hydrocracking catalysts which can be prepared using these improved extrudates as catalyst supports.

In the preceding Examples 1 to 4, the formulas $Al_2(SO_4)_3 \cdot XH_2O$ and $Al(NO_3)_3 \cdot XH_2O$ represent mixtures of hydrated and non-hydrated species of the corresponding salts.

It is to be understood that the foregoing detailed description is given merely by way of illustrtion and that many variations may be made therein without departing from the spirit or scope of the present invention.

What is claimed is:

1. A process for preparing nodules containing alumina, aluminosilicate, or alumina-aluminosilicate mixutres and characterized as having increased crush strength and greater attrition resistance which comprises:
   a. preparing an aqueous solution of an acid salt of aluminum by dissolving salt salt in water,
   b. preparing an aluminum hydroxide binder slurry having pH in the range from about 7.5 to about 9 and comprising from about 0.2 to about 5 percent by weight of $Al_2O_3$ in the hydroxide form by adding sufficient ammonia or aqueous solution of ammonium hydroxide with said aluminum salt solution, said slurry having a viscosity of from about 15 to about 60 centipoises prior to addition of an alumina-containing powder,
   c. preparing a mixture by adding the slurry with a substantially dry powder of alumina, aluminosilicate, or a mixture of alumina with aluminosilicate, said powder being added in an amount of from about 92.5 to about 99.8 parts by weight per one part by weight of the aluminum salt, calculated as $Al_2O_3$, in the slurry,
   d. forming nodules of a desired shape from the mixture,
   e. drying the nodules,
   f. calcining the dried nodules, and
   g. recovering nodules of treated powder bonded with from about 0.05 to about 1.5 parts by weight of alumina ($Al_2O_3$) per 100 parts by weight of the nodules.

2. The process of claim 1 wherein the slurry has a pH from about 8.0 to about 8.6.

3. The process of claim 1 wherein the powder comprises aluminosilicate.

4. The process of claim 1 wherein the powder is of mullite.

5. The process of claim 1 wherein the powder is added in an amount of from about 95 to about 99.8 parts by weight per one part by weight of the aluminum salt, calculated as $Al_2O_3$ in the slurry.

6. The product prepared by the process of claim 1.

7. The product prepared by the process of claim 4.

* * * * *

UNITED STATES PATENT AND TRADEMARK OFFICE
CERTIFICATE OF CORRECTION

PATENT NO. : 3,965,042

DATED : June 22, 1976

INVENTOR(S) : Raymond Douglas Feldwick and Darrell Edward Hildebrandt

It is certified that error appears in the above-identified patent and that said Letters Patent are hereby corrected as shown below:

In Claim 1, column 11, line 4 delete [utres] and insert --tures--.

In Claim 1, colum 11, line 8 delete [salt] after "dissolving" and before "salt" and insert --said--.

Signed and Sealed this

Fourth Day of January 1977

[SEAL]

Attest:

RUTH C. MASON
*Attesting Officer*

C. MARSHALL DANN
*Commissioner of Patents and Trademarks*